(12) United States Patent
Larson et al.

(10) Patent No.: US 8,026,834 B2
(45) Date of Patent: Sep. 27, 2011

(54) METHOD AND SYSTEM FOR OPERATING A DISPLAY DEVICE

(75) Inventors: Brent D. Larson, Cave Creek, AZ (US); John G. Suddreth, Cave Creek, AZ (US)

(73) Assignee: Honeywell International Inc., Morristown, NJ (US)

(*) Notice: Subject to any disclaimer, the term of this patent is extended or adjusted under 35 U.S.C. 154(b) by 605 days.

(21) Appl. No.: 12/135,801

(22) Filed: Jun. 9, 2008

(65) Prior Publication Data

US 2009/0303082 A1    Dec. 10, 2009

(51) Int. Cl.
*G01C 21/00* (2006.01)

(52) U.S. Cl. ........ 340/980; 340/945; 340/973; 340/974; 340/975; 345/7; 345/8; 345/9; 701/14

(58) Field of Classification Search .......... 340/973–975, 340/980, 961, 945; 345/7–9; 701/3, 14; 359/630
See application file for complete search history.

(56) References Cited

U.S. PATENT DOCUMENTS

| | | | | |
|---|---|---|---|---|
| 4,702,698 A * | 10/1987 | Beckwith et al. | ............... | 434/2 |
| 4,752,825 A * | 6/1988 | Buckley et al. | ............... | 348/192 |
| 5,281,960 A * | 1/1994 | Dwyer, III | ............... | 345/31 |
| 6,369,779 B1 * | 4/2002 | Bartlett | ............... | 345/8 |
| 2001/0040534 A1 * | 11/2001 | Ohkawara et al. | ............... | 345/7 |

* cited by examiner

*Primary Examiner* — Brent Swarthout
(74) *Attorney, Agent, or Firm* — Ingrassia Fisher & Lorenz, P.C.

(57) ABSTRACT

Methods and systems for operating a display device are provided. A first image is caused to be displayed on the display device. The first image is at least representative of a field of view from on-board an aircraft. A second image is rendered over the first image on the display device. A luminance of at least a portion of the second image is temporally modulated.

19 Claims, 7 Drawing Sheets

METHOD AND SYSTEM FOR OPERATING A DISPLAY DEVICE

TECHNICAL FIELD

The present invention generally relates to display devices and more particularly relates to methods and systems for operating display devices, such as head-up displays (HUDs), head down displays (HDDs), and near-to-eye (NTE) displays.

BACKGROUND

Modern vehicles, such as aircraft, often include head-up displays (HUDs) that project various symbols and information onto a transparent display, or image combiner, through which a user (e.g., the pilot) may simultaneously view the exterior. Traditional HUDs incorporate fixed image combiners located above the instrument panel on the windshield of the aircraft, or directly between the windshield and the pilot's head.

More recently, "head-mounted" HUDs have been increasingly developed that utilize image combiners, such as near-to-eye (NTE) displays, coupled to the helmet or headset of the pilot that moves with the changing position and angular orientation of the pilot's head. Although an advantage of head-mounted HUDs is that the information displayed may be visible to the pilot regardless of the position or orientation of his or her head, there may circumstances in which the pilot would prefer that the information on the NTE display not be visible, such as when the pilot is attempting to view the terrain with as little visible obstruction as possible, or when the pilot is viewing a display on the instrument panel (i.e., a "head-down" display).

In this sense, traditional HUDS utilizing fixed image combiners offer the advantage that the information displayed is typically only visible when the pilot's head is directly in front of the image combiner. That is, if the pilot leans to the side to look around the image combiner, the information on the HUD is no longer visible. However, such physical movement may make it more difficult to for the pilot to otherwise operate the aircraft.

In other implementations, representations of an outside field of view can be shown on head down displays (HDDs), along with overlaid imagery such as might be used on a traditional HUD.

Accordingly, it is desirable to provide a method and system for operating a display device, such as a traditional HUD, a NTE display, or a HDD displaying a representative field of view along with an overlay, in such a way as to improve the balance of the visibility of the information on the HUD and the image information over which the HUD image is overlaid, for example the outside view. Furthermore, other desirable features and characteristics of the present invention will become apparent from the subsequent detailed description of the invention and the appended claims, taken in conjunction with the accompanying drawings and this background of the invention.

BRIEF SUMMARY

A method for operating a display device is provided. A first image is caused to be displayed on the display device. The first image is at least representative of a field of view from on-board an aircraft. A second image is rendered over the first image on the display device. A luminance of at least a portion of the second image is temporally modulated.

A method of operating a head-up display (HUD) device is provided. A first image is caused to be displayed on the display device. The first image is at least representative of a field of view of a user on-board an aircraft. A second image is rendered on the display device over the first image. The second image includes a plurality of substantially linear adjacent portions. A luminance of the plurality of substantially linear portions of the second image is temporally modulated in a sequence.

An avionics system is provided. The avionics system includes a head-up display (HUD) device and a processor in operable communication with the HUD device. The processor is configured to cause a first image to be displayed on the display device, the first image being at least representative of a field of view from on-board the aircraft, render a second image on the display device over the first image, the second image comprising a plurality of substantially linear adjacent portions, and temporally modulate a luminance of the plurality of substantially linear portions of the second image in a sequence.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-7 are merely illustrative and may not be drawn to scale.

FIG. 1 to FIG. 7 illustrate methods and systems for operating a display device. A first image is caused to be displayed on the display device. The first image is at least representative of a field of view from on-board an aircraft. A second image is rendered on the display device over the first image. A luminance of at least a portion of the second image is temporally modulated.

In one embodiment, the display device is a head-up display (HUD) device on-board an aircraft, and the second image includes symbology and/or enhanced flight vision system (EVS) features. The second image may include a plurality of substantially linear portions that are modulated in sequence from one side of the second image to an opposing side of the second image. The modulating may include increasing the brightness of the portion of the second image and decreasing the brightness of that portion of the second image.

Figure 1:
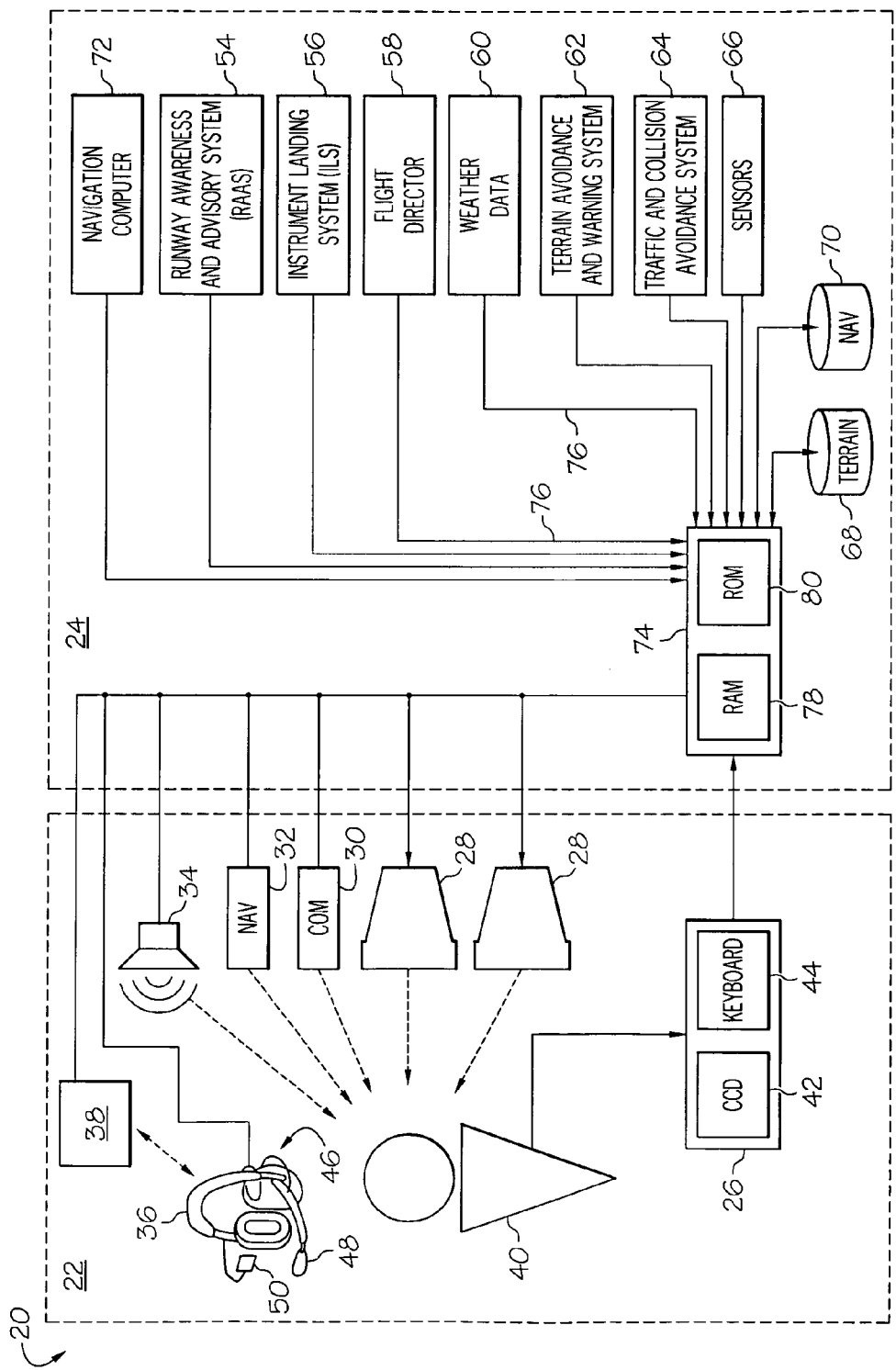
FIG. 1 is a schematic block diagram of an aircraft, according to one embodiment of the present invention.

FIG. 1 schematically illustrates a vehicle 20, such as an aircraft, according to one embodiment of the present invention. The vehicle 20 may be, in one embodiment, any one of a number of different types of aircraft such as, for example, a private propeller or jet engine driven airplane, a commercial jet liner, or a helicopter. In the depicted embodiment, the aircraft 20 includes a flight deck 22 (or cockpit) and an avionics/flight system 24. Although not specifically illustrated, it should be understood that the aircraft 20 also includes a frame or body to which the flight deck 22 and the avionics/flight system 24 are connected, as is commonly understood. It should also be noted that aircraft 20 is merely exemplary and could be implemented without one or more of the depicted components, systems, and data sources. It will additionally be appreciated that the aircraft 20 could be implemented with one or more additional components, systems, or data sources.

The flight deck 22 includes a user interface 26, display devices 28 (e.g., a primary flight display (PFD)), a communications radio 30, a navigational radio 32, an audio device 34, a headset 36, head (and/or eye) motion tracker 38.

The user interface 26 is configured to receive input from a user 40 (e.g., a pilot) and, in response to user input, supply command signals to the avionics/flight system 24. The user interface 26 may include flight controls (not shown) and any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 26 includes a CCD 42 and a keyboard 44. The user 40 uses the CCD 42 to, for example, move a cursor symbol on the display devices 28, and use the keyboard 44 to, for example, input textual data.

Still referring to FIG. 1, the display devices 28 are used to display various images and data, in graphic, iconic, and/or textual formats, and to supply visual feedback to the user 40 in response to the user input commands supplied by the user 40 to the user interface 26. It will be appreciated that the display devices 28 may each be implemented using any one of numerous known displays suitable for rendering image and/or text data in a format viewable by the user 40, such as a cathode ray tube (CRT) displays, a LCD (liquid crystal display), or a TFT (thin film transistor) displays. The display devices 28 may also be implemented on the flight deck 22 as "head-down" displays (HDDs) or a head-up displays (HUDs) projected on a fixed image combiner.

The communication radio 30 is used, as is commonly understood, to communicate with entities outside the vehicle 20, such as air-traffic controllers and pilots of other aircraft. The navigational radio 32 is used to receive from outside sources and communicate to the user various types of information regarding the location of the vehicle, such as Global Positioning Satellite (GPS) system and Automatic Direction Finder (ADF) (as described below). The audio device 34 is, in one embodiment, an audio speaker mounted within the flight deck 22.

The headset 36 includes an interconnected combination of earphones 46, a microphone 48, and a display device, such as a near-to-eye (NTE) display (or display screen) 50. The earphones 46 may substantially form a frame for the headset 36 and be configured to be removably worn by the pilot. The earphones 46 and the microphone 48 may be in operable communication with the communications radio 30, and the NTE display may be in operable communication with the avionics system 24, as described below. The NTE display 50 may be adjustably suspended from the earphones 46 such that the display 50 may be positioned directly in front of an eye of the user 40 while the headset 36 is worn, as is commonly understood. In one embodiment, the NTE display 50 is an image combiner (i.e., a substantially transparent plate), as is commonly understood. The NTE display 50 may also be, for example, a flat panel display screen, such as an LCD display screen. Although not shown, the headset 36 may also include an eye motion detector to detect movement of the eye of the user relative to the user's head. Additionally, the headset 36 may include various hardware, such as inertial sensors, to detect movements of the user's head.

As is commonly understood, the motion tracker 38 is configured to detect (either solely or in combination with the hardware in the headset 36) movements (i.e., position and angular orientation) of the pilot's head, the headset 36 as a whole, and/or the NTE display 50. Although not shown, the motion tracker 38 may utilize various methods to determine the movements including optical and/or infrared components and inertial sensors located within the headset 36.

As shown in FIG. 1, the avionics/flight system 24 includes a runway awareness and advisory system (RAAS) 54, an instrument landing system (ILS) 56, a flight director 58, a weather data source 60, a terrain avoidance warning system (TAWS) 62, a traffic and collision avoidance system (TCAS) 64, a plurality of sensors 66 (e.g., a barometric pressure sensor, a thermometer, and a wind speed sensor), one or more terrain databases 68, one or more navigation databases 70, a navigation and control system (or navigation computer) 72, and a processor 74. The various components of the avionics/flight system 24 are in operable communication via a data bus 76 (or avionics bus). Although not illustrated, the navigation and control system 72 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear).

The processor 74 may be any one of numerous known general-purpose controller or an application specific processor that operates in response to program instructions, such as field programmable gate arrays (FPGAs), application specific integrated circuits (ASICs), discrete logic, microprocessors, microcontrollers, and digital signal processors (DSPs), or combinations thereof. In the depicted embodiment, the processor 74 includes on-board RAM (random access memory) 78 and on-board ROM (read only memory) 80. The program instructions that control the processor 74 may be stored in either or both the RAM 78 and the ROM 80. For example, the operating system software may be stored in the ROM 80, whereas various operating mode software routines and various operational parameters may be stored in the RAM 78. The RAM 78 and/or the ROM 80 may include instructions stored thereon for carrying out the methods and processes described below. It will be appreciated that this is merely exemplary of one scheme for storing operating system software and software routines, and that various other storage schemes may be implemented. It will also be appreciated that the processor 74 may be implemented using various other circuits, not just a programmable processor. For example, digital logic circuits and analog signal processing circuits could also be used.

During operation of the aircraft 20, the headset 36 is worn by the pilot 40 (or other user), and the earphones 46 and the microphone 48 are used to communicate with ground personnel, as well as other aircraft. Additionally, the NTE display 50 is adjusted such that it is positioned directly in front of at least one of the user's 40 eyes.

Figure 2:
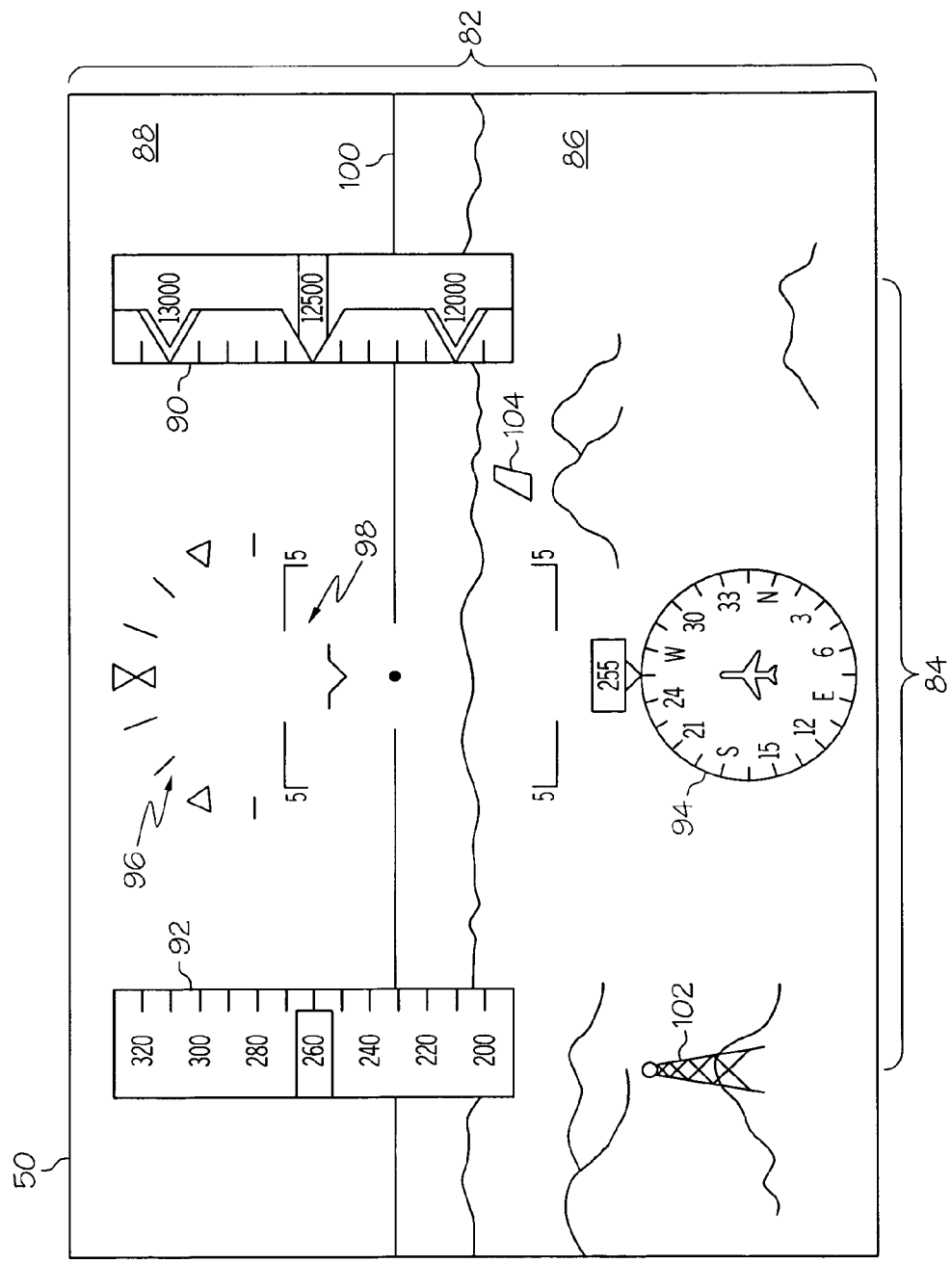
FIG. 2 is a plan view of a near-to-eye (NTE) display within the aircraft of FIG. 1 with first and second images rendered thereon.

FIG. 2 illustrates the NTE display 50 during operation. On the NTE display 50 are shown a first image 82 and a second image 84. In the depicted embodiment, the first image 82 is an underlying terrain image that is at least representative of the pilot's view from the flight deck 22. In the exemplary embodiment shown in FIG. 2, the first image 82 depicts a perspective view from the aircraft 20 of the terrain outside the aircraft 20 and covers substantially the entire display 50. The first image 82 includes a terrain portion 86 and a sky portion 88, as delineation between terrain and sky is of high importance for pilot performance. As is commonly understood, in an embodiment in which the display 50 is an image combiner, the first image 82 is simply the pilot's 40 actual view of the physical terrain (and/or the interior of the flight deck 22) as seen through the NTE display 50. While, in an embodiment in which the NTE display 50 is, for example, an LCD display, the first image 82 may be a computer-generated image (e.g., synthetic vision) based on multiple readings from various instruments onboard the aircraft 20 that provide a current position and/or orientation (e.g., heading) of the aircraft 20 and changes as the position and/or orientation of the aircraft 20 changes, as well as the terrain and navigational databases 68 and 70 (FIG. 1). As indicated on FIG. 2, terrain features (e.g., hills, mountains, valleys, etc.) may be shown on the first image 82 to assist the user 40 with the operation of the aircraft 20.

Still referring to FIG. 2, the second image (or HUD image) 84 is displayed over the first image 82. The second image 84 includes, in the embodiment shown in FIG. 2, various "symbology" features 90-100 and enhanced flight vision system ("EVS") features 102 and 104. The symbology features include multiple digital instruments, such as an altitude indicator 90, an airspeed indicator 92, a heading indicator 94, a roll indicator 96, and a pitch indicator 98 (including a horizon bar 100). In the embodiment illustrated, the altitude indicator 90 and the airspeed indicator 92 are displayed as an altitude "tape" and an airspeed tape, respectively, as is commonly understood. The heading indicator 94 is graphically displayed as a compass at a lower center portion of the display 50. The roll indicator 96 is displayed above the heading indicator 94 at an upper portion of the display 50, and the pitch indicator 98 is positioned between the heading indicator 94 and the roll indicator 96. The digital instruments 90-98 provide an indication of a position and/or orientation (i.e., heading, pitch, roll, etc.) of the aircraft 20 to the user 40. The horizon bar 100 extends horizontally near the center of the screen 50, through the pitch indicator 98.

The EVS features shown include terrestrial images of a radio tower 102 and a runway 104. As is commonly understood, the EVS systems typically utilize an "enhanced vision" camera or sensor, such as an infrared camera, to generate images of real world objects on the exterior of the aircraft and display them overlaying another image (e.g., the first image 82). These overlaid images (e.g., 102 and 104) facilitate the pilot's operation of the aircraft by clearly marking real-world objects (e.g., a real-world radio tower and a real-world runway).

In one embodiment, the entire second image 84 (i.e., the symbology and/or the EVS features) begins at a relatively low luminance (e.g., 0% of maximum luminance). Different portions of the second image 84 are then successively increased in luminance for a brief period of time (e.g., a pulse). After the brief period of time, each of the portions of the second image is dimmed (e.g., exponentially). This process is repeated at regular intervals so that the pilot 40 becomes accustomed to the rhythm with which the different portions of the second image 84 are "refreshed."

Figure 3:
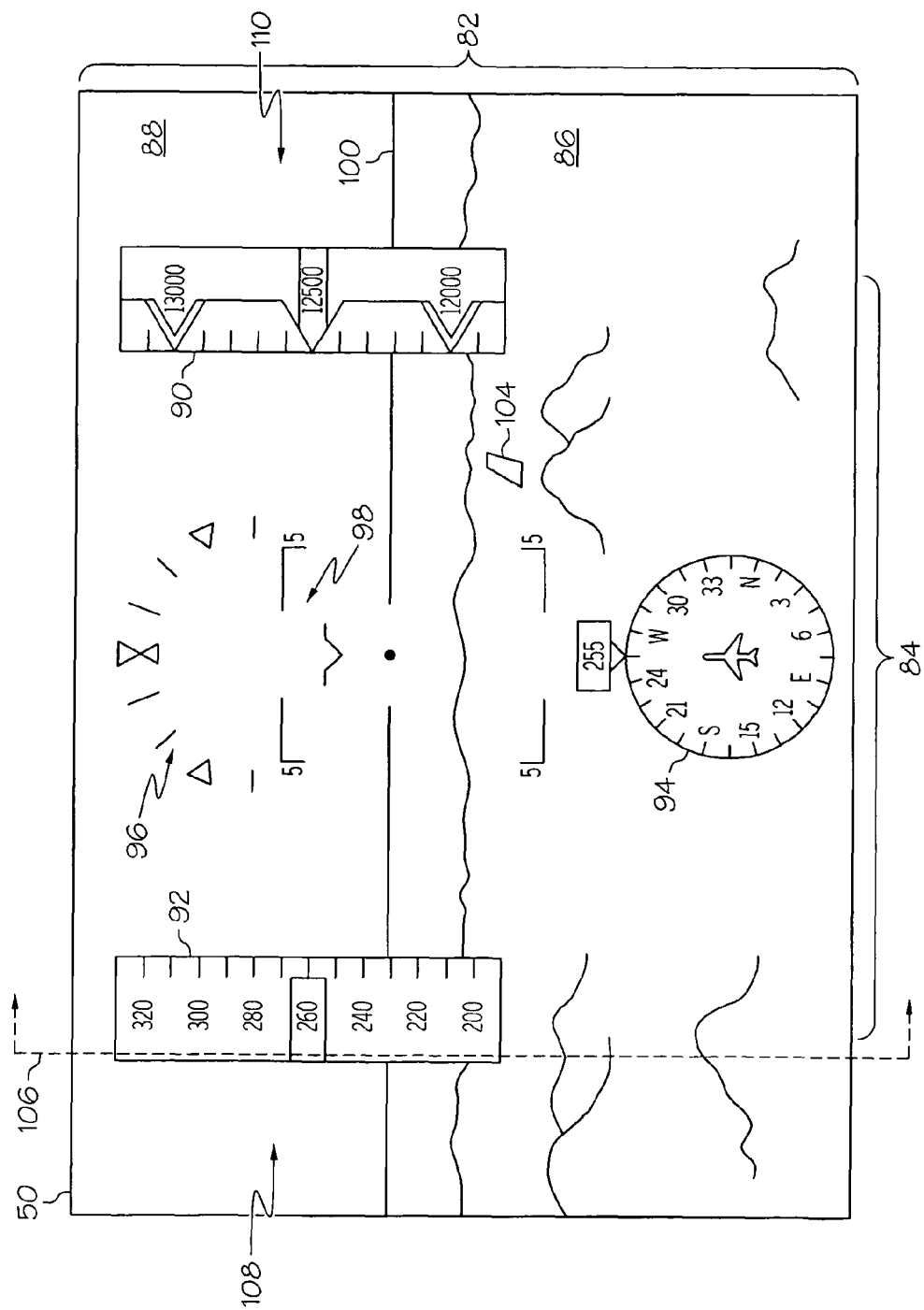
FIG. 3 is a plan view of the NTE display similar to FIG. 2 illustrating a temporal modulation of the second image, according to one embodiment of the present invention.
Figure 4:
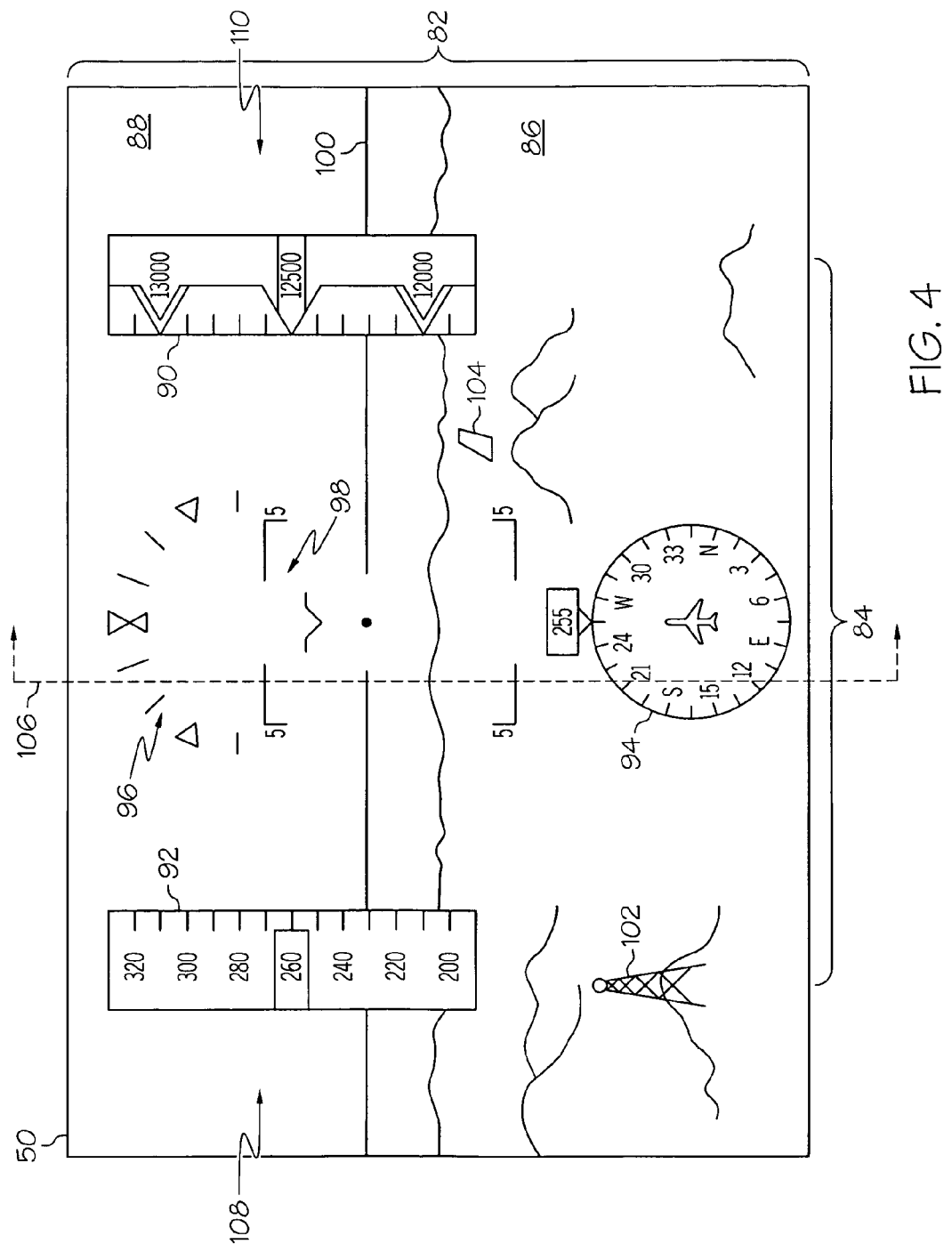
FIG. 4 is a plan view of the NTE display further illustrating the temporal modulation of the second image in FIG. 3.

As shown in FIGS. 3 and 4, a dashed line 106, which may not be visible to the user 40, is swept across the NTE display 50 from a first (or left) side 108 of the second image 84 to a second (or right) side 110 of the second image 84. As the dashed line 106 passes over the second image 84, the portion of the second image that is "covered" (or congruent) with the dashed line 106 is increased in luminance so that it is visible by the user 40. As such, the second image 84 may be considered to be divided into numerous vertical, linear portions that are, for example, one pixel wide, which correspond to the portions of the second image 84 that are congruent with the dashed line 106. These portions are successively brightened across the screen such that the second image 84 is "swept" into view from, in the depicted embodiment, from left to right. In one embodiment, the dashed line 106 may traverse the second image 84 from the first side 108 to the second side 110 in, for example, between 0.5 and 5.0 seconds (s).

Figure 5:
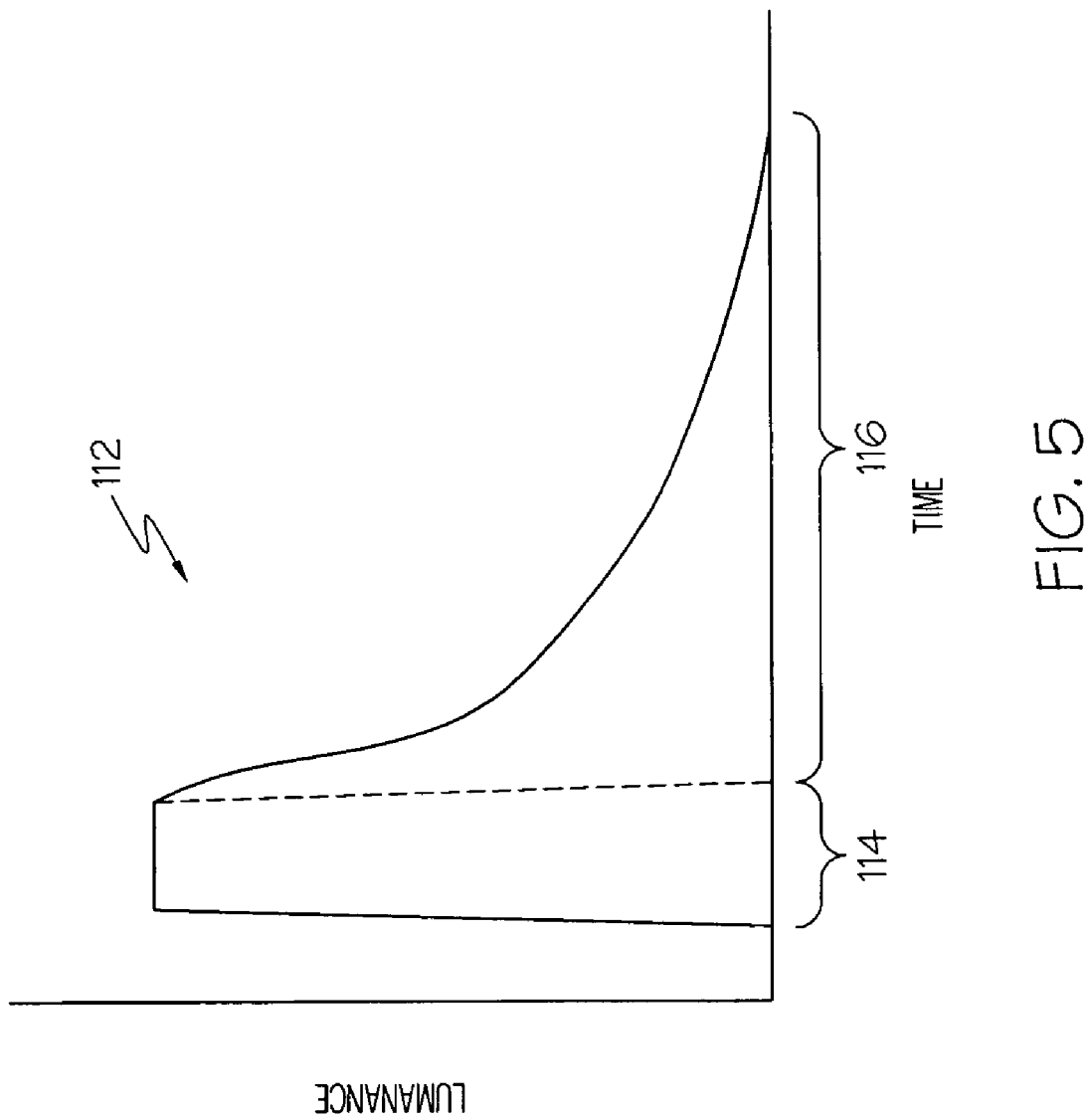
FIG. 5 is a graphical illustration of a luminance profile of a portion of the second portion of the image of FIGS. 3 and 4.

FIG. 5 illustrates a luminance profile 112 for one of the linear portions of the second image 84 shown in FIGS. 3 and 4. The luminance profile includes a pulse section 114 and a decay section 116. The pulse section 114 occurs as the dashed line 106 passes over the particular section of the second image 84 (FIG. 5) and is characterized by the luminance being increased from a very low luminance (e.g., 0%) to a relatively high luminance (e.g., 80%) in a very short time (such that the slope of the profile 112 is nearly vertical, although longer rise times may alternately be used). After the dashed line 106 has moved on to another portion of the image, the luminance is gradually decreased as indicated by the decay section 116 of the profile 112. That is, the first of the portions is dimmed while the second portion is "pulsed" as described above.

In one embodiment, the pulse section 114 has a duration of, for example, between 0.05 and 0.5 s, and the decay section 116 has a duration of, for example, between 0.5 and 5.0 s. Thus, after the second image 84 is "swept" into view by dashed line 106, the second image 84 fades, or is dimmed, out of view. In the embodiment shown in FIGS. 4 and 5, the second image 84 fades from left to right, as the left side 108 of the second image 84 is pulsed before the right side 110.

The process may then begin again with dashed line 106 beginning again at the left side 108. This subsequent sweep of dashed line 106 may begin immediately after the previous sweep, or after a delay, such as several seconds. As such, several features of the system described herein may be adjustable by the user 40 through, for example, the user interface 26, such as the speed at which the dashed line 106 traverses the second image 84, the lengths of and/or slopes of the pulse and decays sections 114 and 116 of the luminance profile 112, and the delay between successive sweeps of the dashed line 106.

Figure 6:
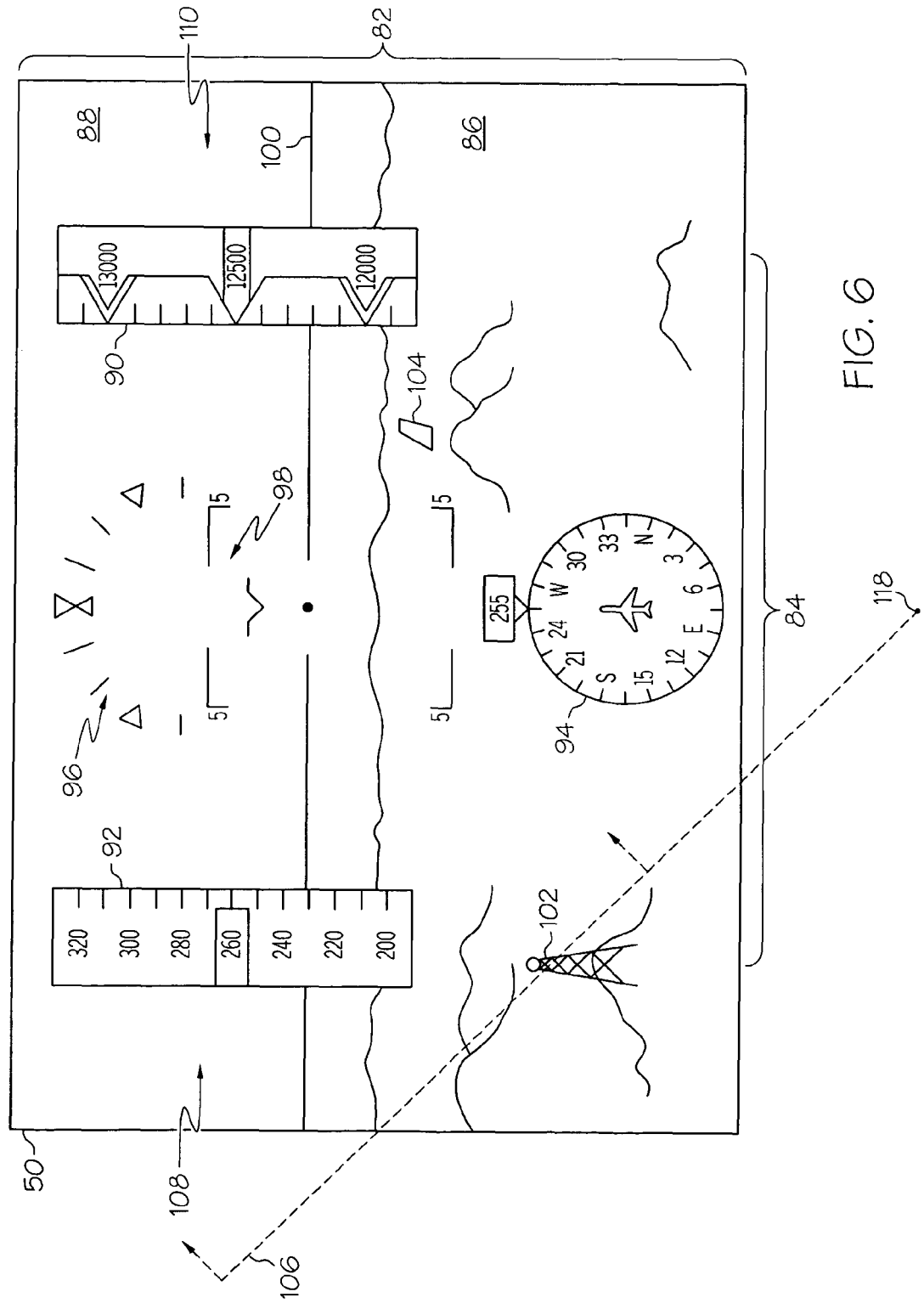
FIG. 6 is a plan view of the NTE display illustrating a temporal modulation of the second image, according to another embodiment of the present invention.
Figure 7:
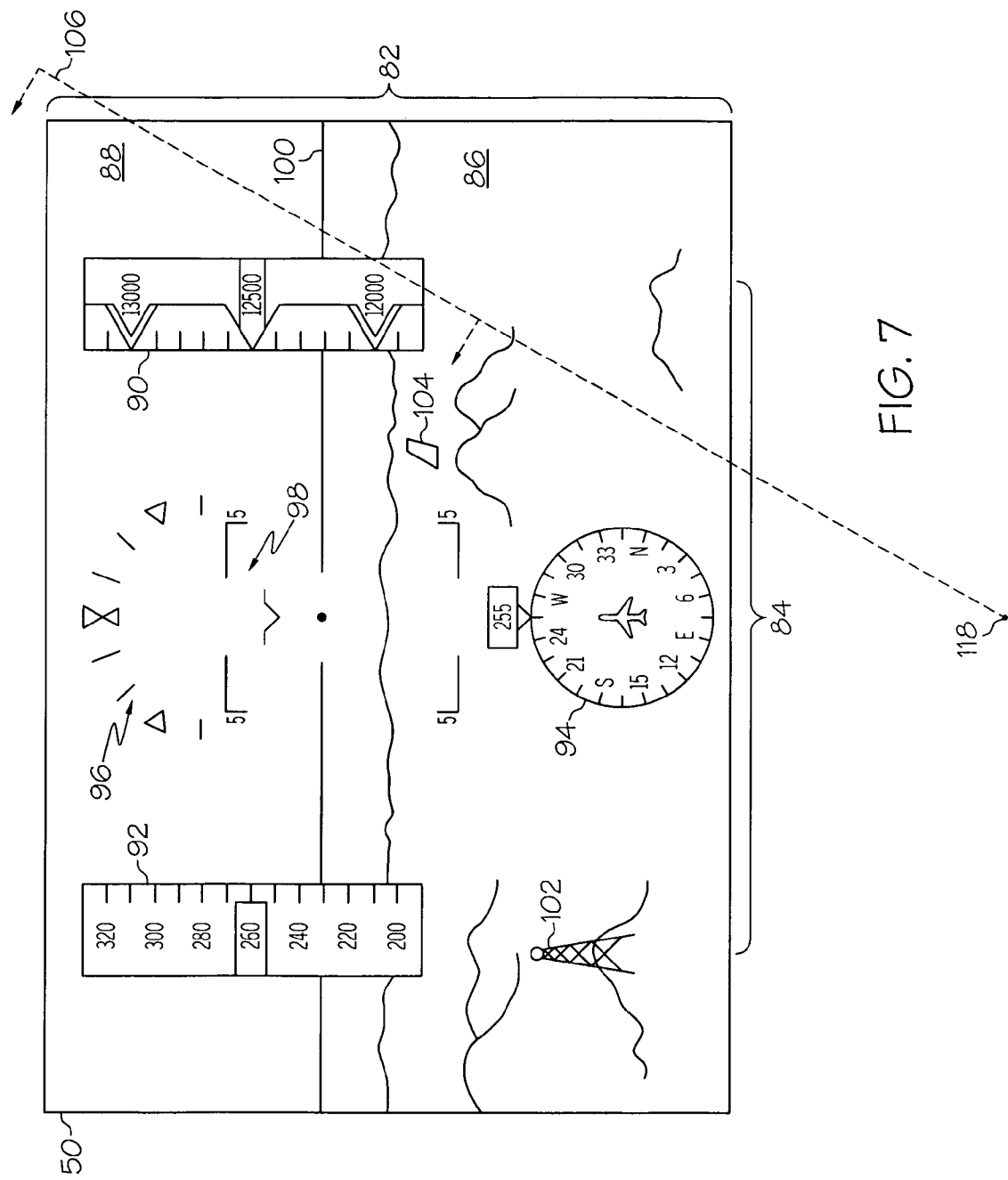
FIG. 7 is a plan view of the NTE display further illustrating the temporal modulation of the second image in FIG. 6.

FIGS. 6 and 7 illustrate the NTE display 50 according to another embodiment of the present invention. As shown, the dashed line 106 in FIGS. 6 and 7 is oriented differently than in FIGS. 3 and 4. Specifically, the dashed line 106 pivots about a pivot point 118, which is located in a fixed position relative to and below the NTE display 50 (at least virtually, as the pivot point 118 is not visible to the user 40). As such, the dashed line 106 pivotably sweeps across the second image 84 in a manner similar to that of a "windshield wiper." Additionally, the dashed line traverses from the left side 108 of the second image 84 to the right side 110 of the second image 84, and then from the right side 110 to the left side 108 (i.e., back-and-forth between the left side 108 and the right side 110). As such, the orientation of the dashed line 106 may be changed in other embodiment, as may the direction of the motion of the dashed line 106. In another embodiment, the pivot point 118 may be located on the NTE display 50 such that it is visible to the user 40. In yet another embodiment, the direction of traversal may remain the same. In further embodiments, the pivot point 118 may be fixed with respect to the a reference frame other than the display, for example a point in the vehicle's frame of reference or the outside world's frame of reference.

One advantage of the method and system described above is that the HUD image is displayed in a predictably intermittent manner. As such, the HUD image provides information to the user in a manner which minimizes visual obstruction.

Other embodiments may include EVS or synthetic vision images overlaid in a conformal manner, or may utilize the method and system described above on vehicles other than aircraft, such as land vehicles and watercraft. The methods and systems described above may be used in conjunction with other types of display devices, such as HDDs, and may also be used on unmanned vehicles, in which the operational display system is part of a station where a user remotely controls the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a display device comprising:
   causing a first image to be displayed on the display device, the first image being at least representative of a field of view from on-board an aircraft;
   rendering a second image over the first image on the display device; and
   temporally modulating a luminance of at least a portion of the second image, said temporal modulation comprising repeatedly:
   increasing the luminance of the at least a portion of the second image from a first luminance to a second luminance over a first time period, and
   gradually decreasing the luminance of the at least a portion of the second image from the second luminance to the first luminance over a second time period, the second time period greater than the first time period.

2. The method of claim 1, wherein the at least a portion of the second image comprises a plurality of adjacent portions of the second image.

3. The method of claim 2, wherein said temporal modulation further comprises:
   increasing the luminance of a first of the portions of the second image over the first time period;
   gradually decreasing the luminance of the first of the portions of the second image over the second time period;
   increasing the luminance of a second of the portions of the second image over the first time period, the second of the portions of the image being adjacent to the first of the portions; and
   gradually decreasing the luminance of the second of the portions of the second image over the second time period.

4. The method of claim 3, wherein the increasing of the luminance of the second of the portions of the second image occurs during the gradual decreasing of the luminance of the first of the portions.

5. The method of claim 4, wherein each of the plurality of adjacent portions of the second image are substantially linear.

6. The method of claim 5, wherein the second image comprises first and second opposing sides and said temporal modulation of the substantially linear portions of the second image occur in a sequence such that the substantially linear adjacent portions are temporally modulated from the first side of the second image to the second side of the second image.

7. The method of claim 6, further comprising repeating the sequence of the temporal modulation.

8. The method of claim 7, wherein the display device is a head-up display (HUD) device and the first image is at least representative of a field of view from on-board the aircraft.

9. The method of claim 8, wherein the second image comprises at least one of symbology and enhanced flight vision system (EVS) features.

10. A method of operating a head-up display (HUD) device comprising;
    causing a first image to be displayed on the display device, the first image being at least representative of a field of view of a user on-board an aircraft;
    rendering a second image on the display device over the first image, the second image comprising a plurality of substantially linear adjacent portions; and
    temporally modulating a luminance of the plurality of substantially linear portions of the second image in a sequence, said temporal modulation comprising repeatedly:
    increasing the luminance of the at least a portion of the second image from a first luminance to a second luminance over a first time period, and
    gradually decreasing the luminance of the at least a portion of the second image from the second luminance to the first luminance over a second time period, the second time period greater than the first time period.

11. The method of claim 10, wherein the second image comprises first and second opposing sides and the sequence of the temporal modulation is such that the substantially linear adjacent portions are temporally modulated from the first side of the second image to the second side of the second image.

12. The method of claim 11, wherein said temporal modulation further comprises:
    increasing the luminance of a first of the portions of the second image over the first time period;
    gradually decreasing the luminance of the first of the portions of the second image over the second time period;
    increasing the luminance of a second of the portions of the second image over the first time period, the second of the portions of the image being adjacent to the first of the portions; and
    gradually decreasing the luminance of the second of the portions of the second image over the second time period.

13. The method of claim 12, further comprising repeating the sequence of the temporal modulation.

14. The method of claim 12, further comprising temporally modulating the luminance of the plurality of substantially linear portions of the second image in a second sequence, wherein the second sequence of the temporal modulation is such that the substantially linear adjacent portions are temporally modulated from the second side of the second image to the first side of the second image.

15. An avionics system comprising:
a head-up display (HUD) device; and
a processor in operable communication with the HUD device, the processor being configured to:
cause a first image to be displayed on the display device, the first image being at least representative of a field of view from on-board the aircraft;
render a second image on the display device over the first image, the second image comprising a plurality of substantially linear adjacent portions; and
temporally modulate a luminance of the plurality of substantially linear portions of the second image in a sequence by repeatedly:
increasing the luminance of the at least a portion of the second image from a first luminance to a second luminance over a first time period, and
gradually decreasing the luminance of the at least a portion of the second image from the second luminance to the first luminance over a second time period, the second time period greater than the first time period.

16. The avionics system of claim 15, wherein the second image comprises at least one of symbology and enhanced flight vision system (EVS) features.

17. The avionics system of claim 16, wherein the second image comprises first and second opposing sides and the sequence of the temporal modulation is such that the substantially linear adjacent portions are temporally modulated from the first side of the second image to the second side of the second image.

18. The avionics system of claim 17, wherein the processor is further configured to repeat the sequence of the temporal modulation.

19. The avionics system of claim 18, further comprising a headset configured to be worn on a head of a user and wherein the HUD device is a near-to-eye (NTE) display device adjustably coupled to the headset to be positioned proximate to an eye of the user.

* * * * *